(12) United States Patent
Lam et al.

(10) Patent No.: US 10,248,818 B2
(45) Date of Patent: Apr. 2, 2019

(54) CONDUCTIVE PATTERN READING DEVICE AND METHOD, AND INTERACTIVE PLATFORM USING SAME

(71) Applicant: LEO PAPER BAGS MANUFACTURING (1982) LIMITED, Hong Kong (CN)

(72) Inventors: Cannie Lam, Hong Kong (CN); Daniel Yeung, Hong Kong (CN)

(73) Assignee: Leo Paper Bags Manufacturing (1982) Limited, Hong Kong (CN)

( * ) Notice: Subject to any disclaimer, the term of this patent is extended or adjusted under 35 U.S.C. 154(b) by 0 days.

(21) Appl. No.: 15/775,686

(22) PCT Filed: Dec. 18, 2015

(86) PCT No.: PCT/CN2015/097873
§ 371 (c)(1),
(2) Date: May 11, 2018

(87) PCT Pub. No.: WO2017/084140
PCT Pub. Date: May 26, 2017

(65) Prior Publication Data
US 2018/0330131 A1    Nov. 15, 2018

(30) Foreign Application Priority Data
Nov. 18, 2015  (CN) .......................... 2015 1 0799446

(51) Int. Cl.
*A63H 5/00*      (2006.01)
*G06K 7/06*     (2006.01)
(Continued)

(52) U.S. Cl.
CPC .............. *G06K 7/065* (2013.01); *A63H 5/00* (2013.01); *A63H 33/26* (2013.01);
(Continued)

(58) Field of Classification Search
CPC .... G06K 7/065; G06K 7/10366; A63H 33/26; A63H 5/00
See application file for complete search history.

(56) References Cited

U.S. PATENT DOCUMENTS 6,089,943 A    7/2000  Lo
6,160,540 A *  12/2000 Fishkin ................. A63F 13/00
                                          345/156
(Continued)

FOREIGN PATENT DOCUMENTS

CN       2731612 Y      10/2005
CN       1862622 A      11/2006
(Continued)

*Primary Examiner* — Sonji N Johnson
(74) *Attorney, Agent, or Firm* — Muncy, Geissler, Olds & Lowe, P.C.

(57) ABSTRACT

A conductive pattern reading device and method, and an interactive platform. The reading device comprises a sensing circuit board and a medium printed with conductive patterns. The medium is provided with one or more conductive sensing regions, wherein the conductive patterns are printed in corresponding conductive sensing regions. The sensing circuit board comprises one or more conductive sensing blocks corresponding to the conductive sensing regions and further comprises a sensing chip used for sensing and measuring capacitance values of the various conductive sensing blocks. The sensing chip is connected to the various conductive sensing blocks.

10 Claims, 10 Drawing Sheets

(51) Int. Cl.
  *G06K 7/10*   (2006.01)
  *G09B 5/04*   (2006.01)
  *G09B 5/06*   (2006.01)
  *A63H 33/26*  (2006.01)

(52) U.S. Cl.
  CPC .......... *G06K 7/10366* (2013.01); *G09B 5/04* (2013.01); *G09B 5/06* (2013.01)

(56) References Cited

U.S. PATENT DOCUMENTS

| | | | |
|---|---|---|---|
| 6,330,427 B1 * | 12/2001 | Tabachnik | G09B 5/062 434/308 |
| 8,277,221 B2 * | 10/2012 | Damron | G09B 5/062 434/236 |
| 9,052,790 B2 * | 6/2015 | Yairi | G06F 3/04895 |

FOREIGN PATENT DOCUMENTS

| | | |
|---|---|---|
| CN | 201159944 Y | 12/2008 |
| CN | 201402533 Y | 2/2010 |
| CN | 205230399 U | 5/2016 |

\* cited by examiner

CONDUCTIVE PATTERN READING DEVICE AND METHOD, AND INTERACTIVE PLATFORM USING SAME

FIELD OF THE INVENTION

The disclosure relates to an electronic sounding product, and more particularly, to a conductive pattern reading device and method, and an interactive platform using same.

BACKGROUND OF THE INVENTION

Electronic sounding readings are educational readings that help children to develop their vision, audition and operational abilities, and the children can obtain corresponding sounds or music through placing or touching different cards or tags to increase the interest and interactivity of the readings and break the boring learning methods, so that the children can learn in entertainment. The technical product has a simple structure and is convenient to use, if beautiful music or wonderful contents are used, it can cultivate good behavioral habits of the children, and is specifically suitable for the children to use.

There are many electronic sounding books of different sizes and types on the market today meeting the needs of the market. However, the technical requirements and functions of other products cannot reach that of the product. Meanwhile, the cost of the technical product is relatively high.

Traditional electronic components such as a rigid printed circuit board, a wire, and a metal dome (commonly known as snap dome) are generally used in the electronic sounding books on the market, the conduction and stable resilience of the metal dome in operation can provide a switch effect with good conduction and good hand feeling, but it takes a certain amount of force to press the metal dome, which has certain difficulties for young children. Furthermore, a rigid printed circuit board is arranged underneath the metal dome, and the thick and rigid features thereof also increase the limitation to an installation space.

There is a jigsaw sounding e-book currently, by arranging voice or coding chips in jigsaw cards and placing the jigsaw cards in corresponding groove positions of the e-book, the jigsaw sounding e-book reads the data of the voice or coding chips in the jigsaw cards through conductive wafers, and sounds correspondingly, and the conductive wafers can also be replaced by RFID recognition mode to conduct recognition. However, the cost in the technical solution above is too high, and more importantly, since the jigsaw cards need built-in chips, in order to avoid damage to the chips in the jigsaw cards, the jigsaw cards need to have sufficient thickness, which can greatly increase the production cost undoubtedly, and the jigsaw cards cannot be applied to relatively thin cards or tags, so that the applicability and portability are insufficient.

SUMMARY OF THE INVENTION

In order to solve the problems above, the disclosure aims at providing a conductive pattern reading device and method, and an interactive platform using the device avoiding arranging a chip in a medium to finish recognition sounding and realizing portability of product with strong applicability.

The technical solution used in the disclosure to solve the problem thereof is as follows.

A conductive pattern reading device comprises a sensing circuit board and a medium printed with conductive patterns of corresponding codes, wherein the medium is provided with one or more conductive sensing regions, the conductive patterns are printed in the corresponding conductive sensing regions, the sensing circuit board comprises one or more conductive sensing blocks corresponding to the conductive sensing regions, and further comprises a sensing chip used for sensing and detecting a capacitance value of each conductive sensing block, and the sensing chip is connected to each conductive sensing block on the sensing circuit board.

Further, the sensing circuit board is provided with a common sensing block, the medium is provided with a common sensing region corresponding to the common sensing block, and the conductive patterns are continuously printed on the common sensing region and the conductive sensing region.

Further, the medium and the conductive patterns on the medium are formed by an independent part, or formed by two or more parts through jointing.

Further, partial conductive patterns on each part are corresponding to an independent code, and the conductive pattern after mutually combining the parts is corresponding to another independent code.

Further, a shape and a size of the conductive sensing block can be similar to or inconsistent with that of the conductive sensing region, but positions are corresponding.

Further, a shape and a size of the common sensing block can be similar to or inconsistent with that of the common sensing region, but positions are corresponding.

Further, the medium is but not limited to a card, a tag, a film, a book, a jigsaw, a building block, a magnetic tag, a paper article, a non-paper article, etc. and the conductive pattern on the medium is conductive printing carbon paste, silver paste, hot stamping or cold stamping.

Further, the sensing circuit board is a traditional circuit board or a printed electronic circuit board, and texture of the sensing circuit board can be but not limited to fiber board, PET, paper, composite paper or any non-metal type.

Further, the conductive sensing region and the conductive sensing block are rectangular, circular, annular, heart-shaped, regular or irregular.

Further, the common sensing block and the common sensing region are rectangular, circular, annular, heart-shaped, regular or irregular.

According to a conductive pattern reading method based on the conductive pattern reading device above, different conductive patterns on the medium are corresponding to different codes, a capacitance value of each conductive sensing block is sensed and detected by a sensing chip, when the sensing circuit board is contacted with or close to the medium printed with the conductive pattern, the capacitance value of the conductive sensing block corresponding to the conductive sensing region printed with the conductive pattern is changed, the sensing chip converts the corresponding code of the conductive pattern through sensing the capacitance value of each conductive sensing block, i.e., reads the conductive pattern on the medium.

An interactive platform using the conductive pattern reading device comprises an interactive platform carrier and the medium printed with the conductive pattern, wherein the interactive platform carrier comprises a sensing chip, a sounding device and the sensing circuit board, the sounding device, the sensing chip and a sensing circuit board are connected in sequence, the sensing chip senses the corresponding conductive pattern on the medium through the sensing circuit board and converts the corresponding conductive pattern into a corresponding code, and the sounding device drives a loudspeaker to sound correspondingly according to the corresponding code.

Further, the interactive platform carrier is but not limited to a book body, a toy, a daily article, a packing box or a device of any form.

The disclosure has the beneficial effects that:

according to the conductive pattern reading device and the reading method thereof used in the disclosure, the sensing chip recognizes corresponding codes of different conductive patterns on the medium through sensing and detecting the capacitance value of each conductive sensing block and reads the conductive patterns of the medium; since the medium is only printed with the conductive patterns avoiding arranging the chip and/or the coil in the medium, the production cost of the medium is efficiently reduced, and more importantly, the medium can be made of soft or super thin materials, such as a thin card, a tag, a film and other paper articles and non-paper articles, but the materials are not limited to the paper articles and non-paper articles, which effectively reduces the weight of the product and increases the portability and diversity of the product. In addition, the mode of recognizing the conductive patterns is used, and the recognition can only be finished by enabling the sensing circuit board to be slightly contacted with or be close to the medium, which is very convenient for the children to use and greatly saves the installation space.

According to the interactive platform using the conductive pattern reading device used in the disclosure, the sensing chip recognizes corresponding codes of different conductive patterns on the medium through sensing and detecting the capacitance value of each conductive sensing block and reads the conductive patterns of the medium, and the sounding device drives a loudspeaker to sound correspondingly according to the corresponding code. Printing the conductive patterns on the medium according to the disclosure avoids arranging the chip and/or the coil in the medium, thereby effectively reducing the production cost of the medium, and more importantly, operations can be easily implemented by using simple tags or cards, and then a sound or music of corresponding contents can be obtained through touching or placing according to different designs, and the technical product has many functions and rich contents, and the tags or cards can be placed at different positions and can be flexibly used at any time. The disclosure is not limited to a voice chip, and different chips can be used for different outputs, such as light, picture, image or action.

BRIEF DESCRIPTION OF THE DRAWINGS

The disclosure is further described hereinafter with reference to the drawings and the embodiments.

DETAILED DESCRIPTION OF THE EMBODIMENTS

Figure 1:
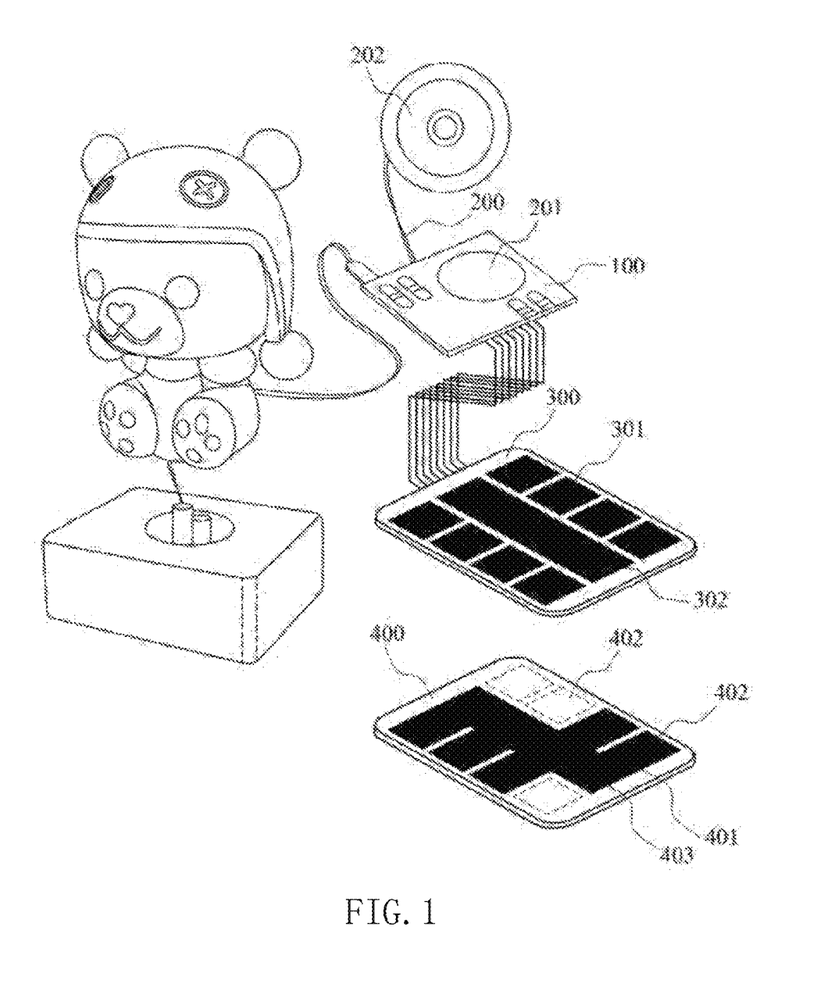
FIG. 1 is a structural decomposition diagram of a conductive pattern reading device and an interactive platform according to the disclosure.
Figure 2:
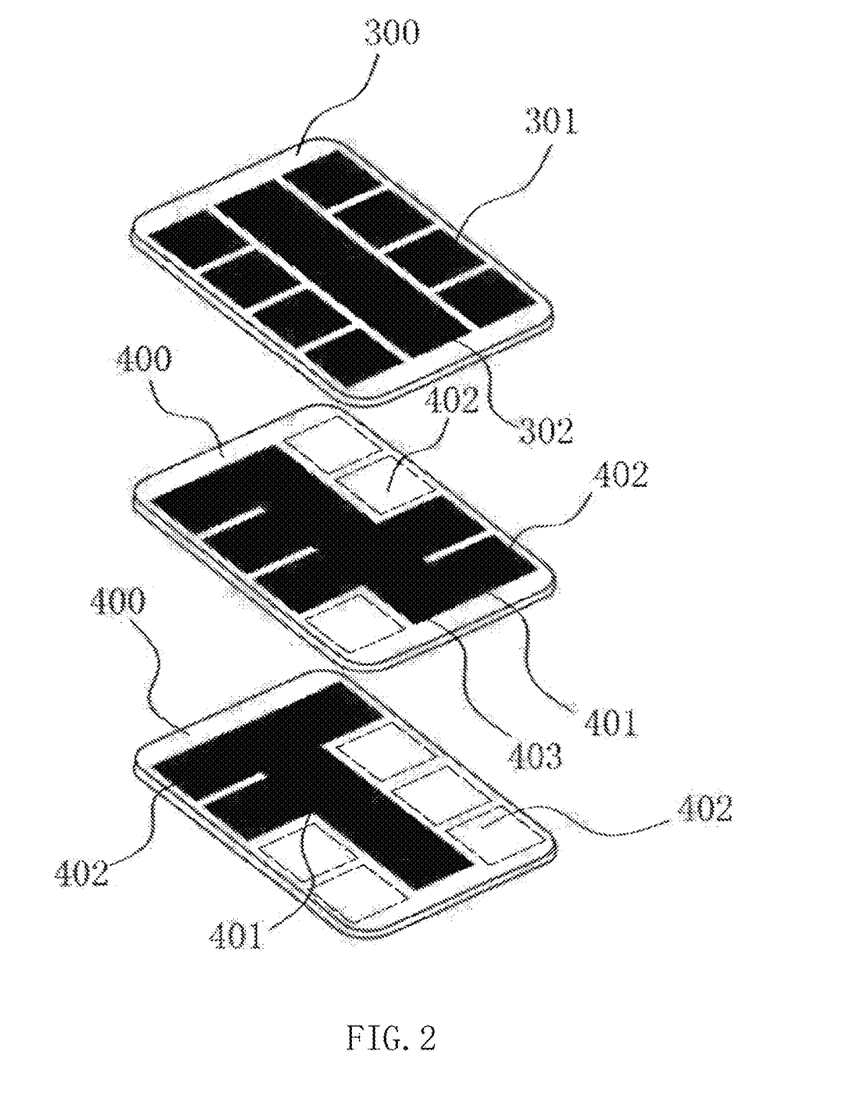
FIG. 2 and FIG. 3 are diagrams of corresponding relationship between a conductive sensing block of a sensing circuit board and different conductive patterns on a medium.
Figure 3:
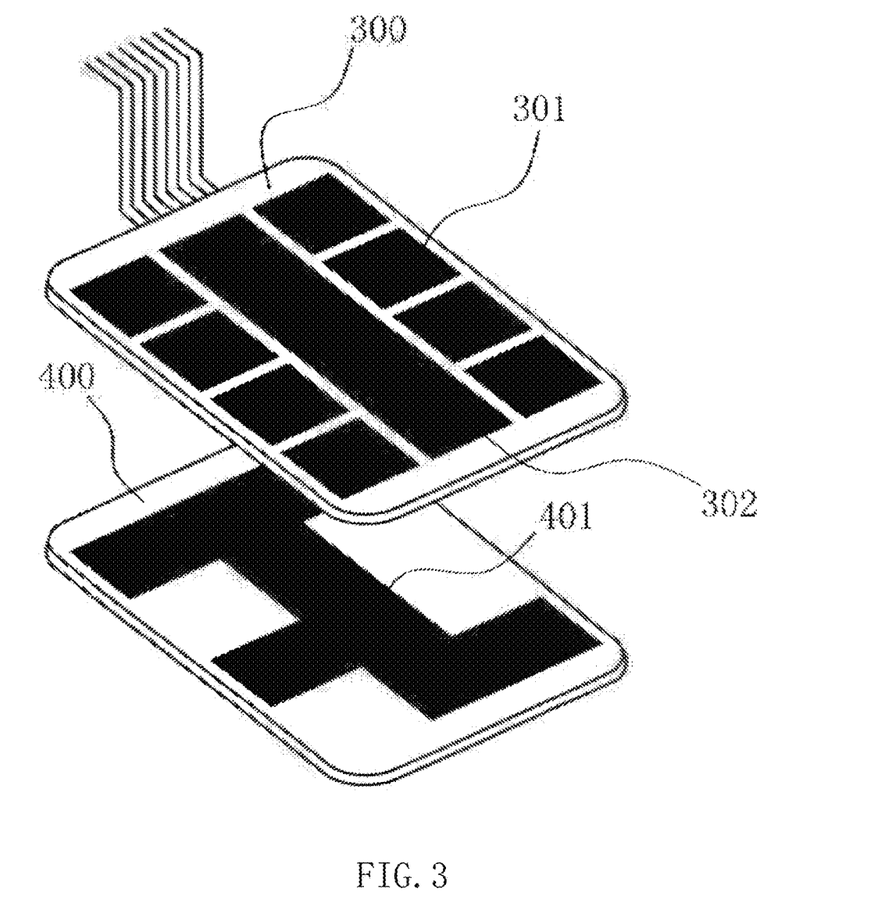

Referring to FIG. 1 to FIG. 18, a conductive pattern reading device of the disclosure comprises a sensing chip 100, a sensing circuit board 300 and a medium 400 printed with conductive patterns 401, wherein the medium 400 can be printed with different conductive patterns 401, the different conductive patterns 401 on the medium 400 are corresponding to a different code, the number of the code can be infinitely expanded, the medium 400 can be made of super thin or soft materials, such as a thin card, a tag, a film and other paper articles or non-paper articles, but the materials are not limited to the paper articles or non-paper articles, referring to FIG. 2 and FIG. 3, one or more conductive sensing regions 402 are divided on the medium 400, and the conductive patterns 401 are printed on different conductive sensing regions 402 according to different codes thereof to form different conductive patterns 401.

The sensing circuit board 300 is a traditional circuit board or a printed electronic circuit board, of which the texture can be but not limited to fiber board, PET, paper, composite paper or any non-metal type.

Referring to FIG. 1 and FIG. 3, the sensing circuit board 300 comprises one or more conductive sensing blocks 301 corresponding to the conductive sensing regions 402. The sensing chip 100 is connected to each conductive sensing block 301. The sensing chip 100 is used for sensing the capacitance value of each conductive sensing block 301.

When the sensing circuit board 300 is contacted with or is close to the conductive patterns 401 on the medium 400, the conductive sensing regions 402 printed with the conductive patterns 401 can change the capacitance value on corresponding conductive sensing block 301, the sensing chip 100 recognizes different conductive patterns 401 on the medium 400 through sensing and detecting the capacitance value on each conductive sensing block 301, and obtains corresponding codes of the conductive patterns 401 according to the capacitance value detected.

In order to further improve the accuracy of detection, the sensing circuit board 300 is provided with a common sensing block 302, the medium 400 is provided with a common sensing region 403 corresponding to the common sensing block 302, the conductive patterns 401 are continuously printed on the common sensing region 403 and the conductive sensing region 402, and the detecting accuracy of the disclosure can be effectively improved through arranging the common sensing region 403 and the common sensing block 302.

Specifically, a shape and a size of the conductive sensing block 301 are the same as that of the conductive sensing region 402, and a shape and a size of the common sensing block 302 are the same as that of the common sensing region 403. The patterns of the conductive sensing region 402 and the conductive sensing block 301 according to the disclosure are rectangular as shown in FIG. 2 and FIG. 3, the medium 400 and the sensing circuit board 300 are rectangle, the common sensing region 403 and the common sensing block 302 are strip-shaped, which are respectively arranged in a middle part of the medium 400 and the sensing circuit board 300, the conductive sensing region 402 and the conductive sensing block 301 are distributed and arranged at two sides of the common sensing region 403 and the common sensing block 302, certainly, the common sensing region 403 and the common sensing block 302 can also be arranged in different positions due to requirement except for arranging in the middle part, the conductive sensing region 402 and the conductive sensing block 301 can also be arranged in different positions due to requirement except for arranging at the two sides, the two sides of the common sensing region 403 in the embodiment are respectively provided with four conductive sensing regions 402, and certainly, the number of the conductive sensing regions 402 can be arbitrarily arranged according to actual requirement. The conductive patterns 401 are printed on the medium 400 along the conductive sensing region 402 and the common sensing region 403, the conductive patterns 401 printed on each conductive sensing region 402 are respectively and mutually combined with the conductive patterns 401 printed on the common sensing region 403 to form a whole and continuous conductive pattern 401. The design not only makes the conductive patterns 401 to be more convenient in printing, reduces the difficulty of printing the conductive patterns 401, and increases the printing accuracy of the conductive patterns 401, but also mutually connects the conductive patterns 401 on the conductive sensing region 402 to the conductive patterns 401 on the common sensing region 403, which can effectively improve the recognition accuracy of the sensing chip 100 to the capacitance value of the conductive sensing block 301.

Figure 4:
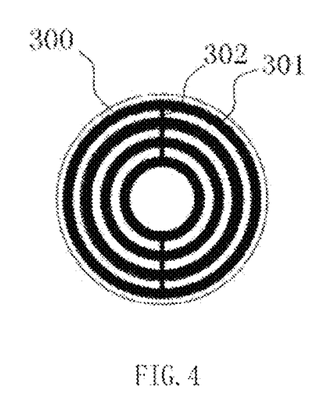
FIG. 4 is a structural diagram of a second embodiment of the sensing circuit board according to the disclosure.
Figure 5:
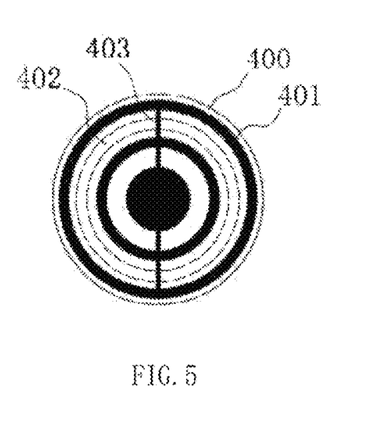
FIG. 5 is a structural diagram of a second embodiment of the conductive patterns on the medium according to the disclosure.

Correspondingly, the conductive sensing region 402 and the conductive sensing block 301 can also be designed into different shapes, as shown in FIG. 4 and FIG. 5, the medium 400 and the sensing circuit board 300 are both arranged in circular, the conductive sensing region 402 and the conductive sensing block 301 are both annular, the medium 400 is provided with the common sensing region 403 connected to each conductive sensing region 402, in the embodiment, by printing different conductive patterns 401 on the conductive sensing region 402, the capacitance value on each annular conductive sensing block 301 is sensed and detected by the sensing chip 100 to obtain corresponding codes of different conductive patterns 401.

The conductive sensing region 402 and the conductive sensing block 301 of the disclosure can be designed into different shapes, such as a heart shape, or any regular or irregular shapes shown in FIG. 10 to FIG. 13, and the shape is not limited to the embodiment above.

The medium 400 in the disclosure can be but not limited to a card, a tag, a film, a book, a jigsaw, a building block, a magnetic tag, a paper article, a non-paper particle, etc. and the conductive pattern 401 on the medium 400 can be formed by means of conductive printing carbon paste, silver paste, hot stamping, cold stamping, or the like. The conductive patterns 401 in the disclosure are printed on the medium 400, and different printing modes can be used in printing, such as painting, transfer printing, and silk printing, hot stamping, cold stamping, and other technologies can also be used, and the printing modes are not limited to this.

Figure 14:
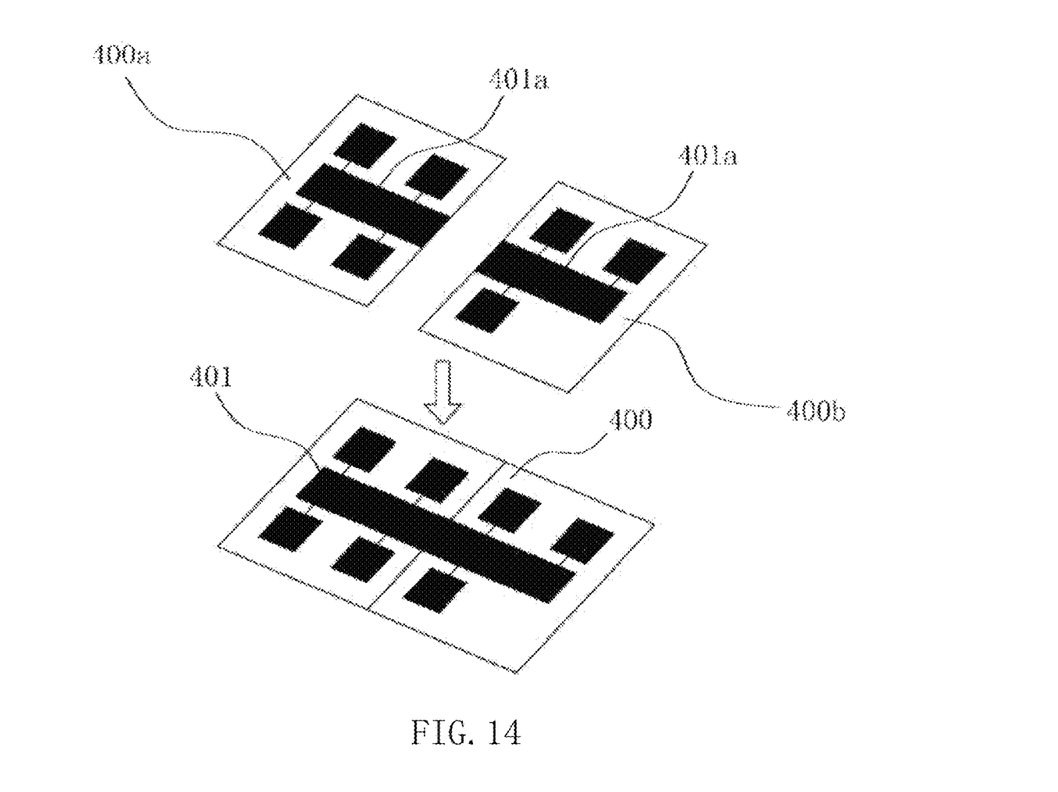
FIG. 14 is a combined schematic diagram of a third embodiment according to the disclosure.

Further, the medium 400 and the conductive patterns 401 on the medium 400 can be formed by an independent part, or formed by two or more parts, referring to FIG. 14, the medium 400 is a card or a tag, the medium 400 comprises a first part 400a and a second part 400b, the first part 400a and the second part 400b are respectively printed with partial conductive patterns 401a, and after the first part 400a and the second part 400b are combined, an entire conductive pattern 401 is formed. After specific conductive pattern is formed through combining, the conductive pattern can further be recognized; certainly, the conductive parts combined above are not limited to two, but may have multiple combined parts, as long as the same principles are applied, they shall be included in the protection scope of the disclosure, and the principles applied to the interactive platform can further improve the interactivity of the product and train the operational ability and brain of the children.

Figure 15:
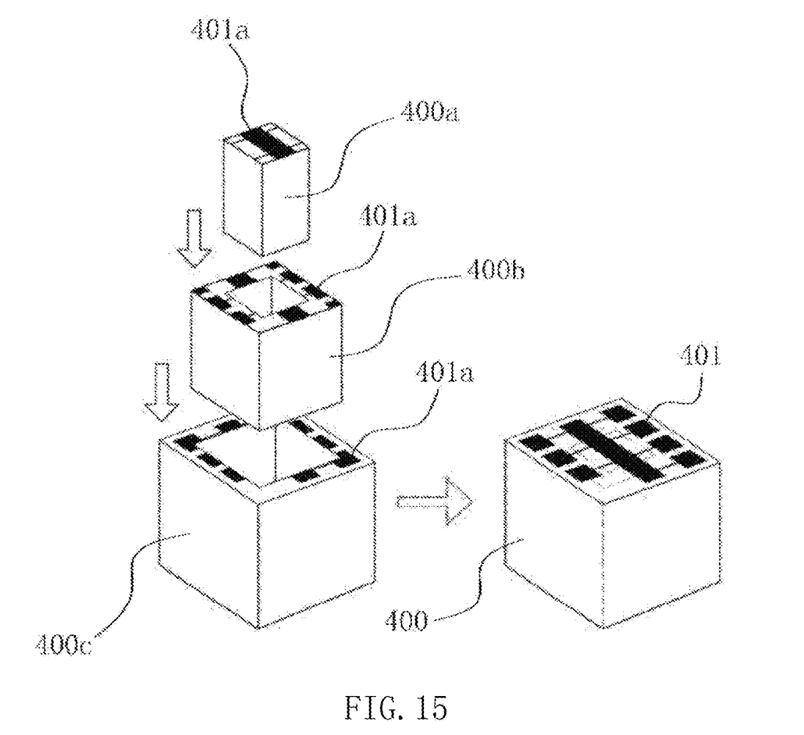
FIG. 15 is a combined schematic diagram of a fourth embodiment according to the disclosure.

Further, the medium 400 can also be a toy article or a daily article combined with each other except for a card or a tag, as shown in FIG. 15, the medium 400 is a toy building block, comprising a first part 400a, a second part 400b and a third part 400c, wherein the first part 400a, the second part 400b and the third part 400c are respectively printed with partial conductive patterns 401a, the first part 400a, the second part 400b and the third part 400c are combined with each other (a nested combining mode is used in the embodiment), and partial conductive patterns 401a on each part are combined into the conductive patterns 401 of corresponding codes, wherein the combining mode can be selected according to requirement, such as laying alongside, overlapping, etc. Except for the toy building block, other toy forms can also be used, or the daily article is combined to form the conductive pattern of corresponding code, which is no longer illustrated one by one, as long as the same principles are applied, they shall be included in the protection scope of the disclosure.

Figure 16:
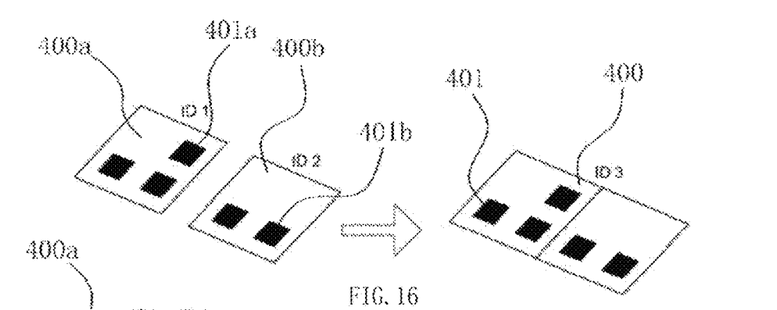
FIG. 16 is a combined schematic diagram of a fifth embodiment according to the disclosure.
Figure 17:
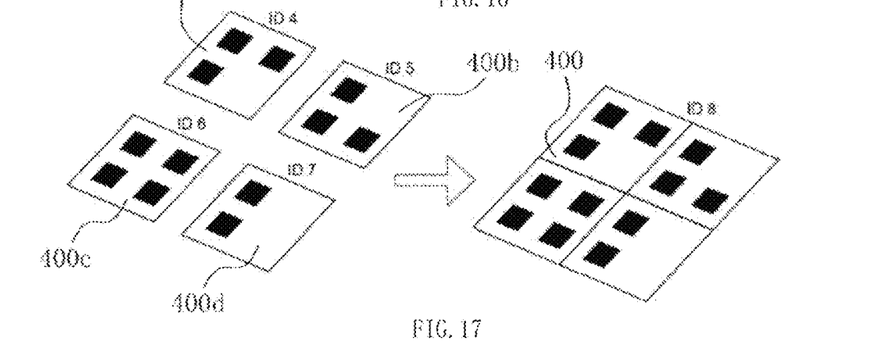
FIG. 17 is a combined schematic diagram of a sixth embodiment according to the disclosure.

Further, except that the conductive patterns of corresponding codes on the medium 400 can be formed by combining to each other, partial conductive patterns on different parts composing the medium 400 can all be corresponding to an independent code, as shown in FIG. 16, comprising the first part 400a and the second part 400b, partial conductive patterns 401a on the first part 400a and the second part 400b are respectively corresponding to codes ID1 and ID2, and when the first part 400a and the second part 400b are combined, the code of the conductive pattern 401 composed is corresponding to ID3. The number of respective combination of the parts is not limited, as shown in FIG. 17, four parts 400a, 400b, 400c and 400d with respective codes ID4, ID5, ID6 and ID7 are used to combine into the medium 400 of code ID8. In this way, the playability and the composability of the product can be provided, and the expansion and application performance of the product can be provided while using to the interactive platform.

According to a conductive pattern 401 reading method based on the conductive pattern reading device, different conductive patterns 401 on the medium 400 are corresponding to different codes, a capacitance value of each conductive sensing block 301 is sensed and detected by a sensing chip 100, when the sensing circuit board 300 is contacted with or close to the medium 400 printed with the conductive pattern 401, the capacitance value of the conductive sensing block 301 corresponding to the conductive sensing region 402 printed with the conductive pattern 401 is changed, the sensing chip 100 converts the corresponding code of the conductive pattern 401 through sensing the capacitance value of each conductive sensing block 301, i.e., reads the conductive pattern 401 on the medium 400.

According to the conductive pattern reading device and the reading method thereof used in the disclosure, the sensing chip 100 recognizes corresponding codes of different conductive patterns 401 on the medium 400 through sensing and detecting the capacitance value of each conductive sensing block 301 and reads the conductive patterns 401 of the medium 400; since the medium 400 is only printed with the conductive patterns 401 avoiding arranging the chip and/or the coil in the medium 400, the production cost of the medium 400 is efficiently reduced, and more importantly, the medium 400 can be made of soft or super thin materials, such as a thin card, a tag, etc. which effectively reduces the weight of the product and increases the portability and diversity of the product. In addition, the mode of recognizing the conductive patterns 401 is used, and the recognition can only be finished by enabling the sensing circuit board 300 to be slightly contacted with or be close to the medium 400, which is very convenient for the children to use and greatly saves the installation space.

Figure 6:
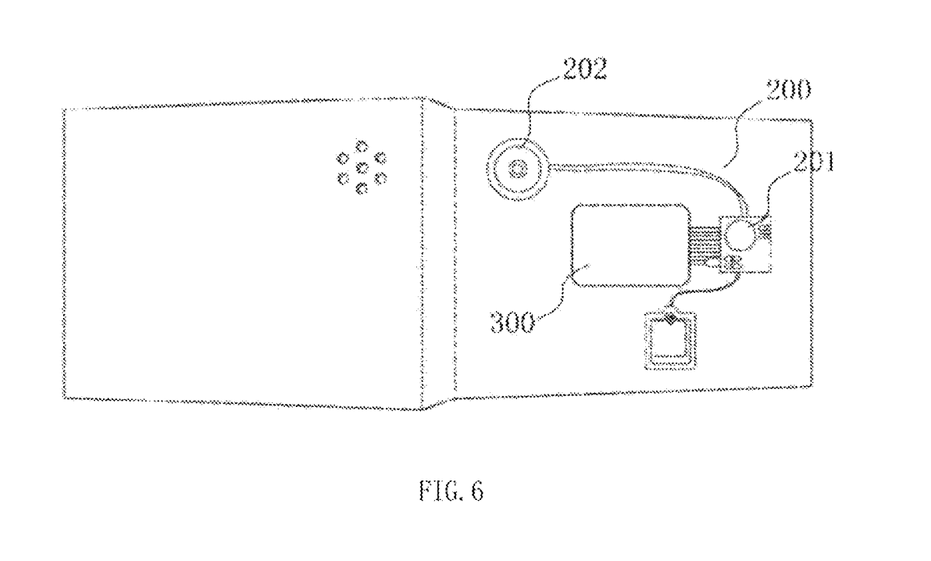
FIG. 6 is a structural diagram of the interactive platform applied to a book according to the disclosure.

The conductive pattern reading device and the reading method thereof above can be used in various interactive platforms, referring to FIG. 1 and FIG. 6, the interactive platform comprises an interactive platform carrier and the medium 400 printed with the conductive pattern 401, wherein the interactive platform carrier comprises a sensing chip 100, a sounding device 200 and the sensing circuit board 300, and further comprises a battery for supplying power to the device above, the sounding device 200, the sensing chip 100 and a sensing circuit board 300 are connected in sequence, audio information corresponding to the code of each conductive pattern 401 is stored in a voice chip 201 in the sounding device 200, the sensing chip 100 senses the corresponding conductive pattern 401 on the medium 400 through the sensing circuit board 300 and converts the corresponding conductive pattern 401 into a corresponding code, and the sounding device 200 drives a loudspeaker 202 to sound correspondingly according to the corresponding code. The disclosure is not limited to the voice chip, and different chips can be used for different outputs, such as light, picture, image or action.

The sounding device 200 comprises the voice chip 201 and the loudspeaker 202, and the code and a voice signal corresponding to the code are stored in the voice chip 201. Wherein, the sensing chip 100 can also be arranged in the voice chip 201, or as shown in FIG. 1, and the voice chip 201 is commonly arranged in a circuit board.

Figure 7:
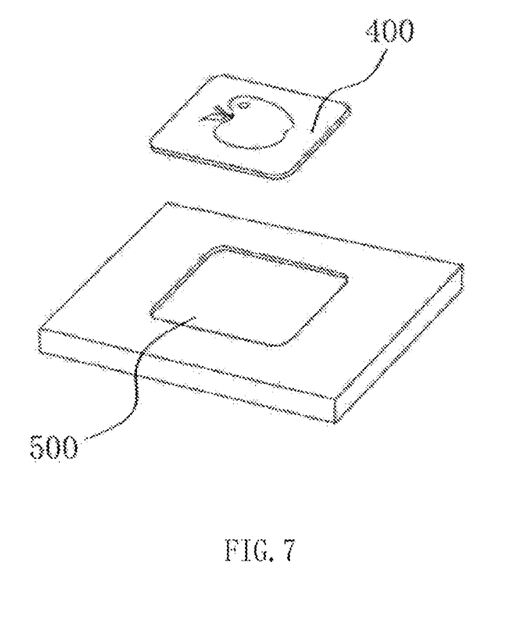
FIG. 7 is a diagram of a structural relationship between a card groove and a card according to the disclosure.
Figure 8:
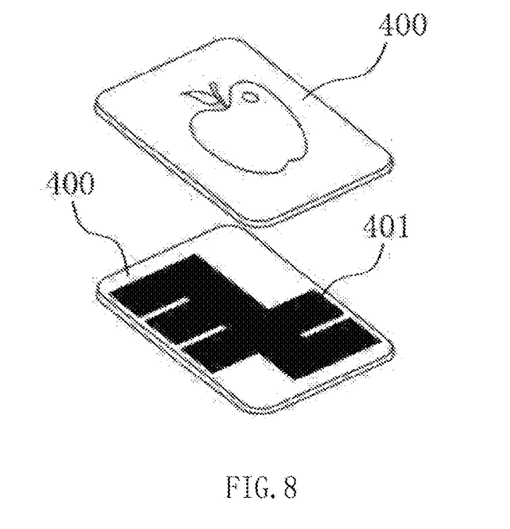
FIG. 8 is a diagram of back and front side structures of the card according to the disclosure.

The interactive platform carrier of the disclosure can also be realized by many forms comprising but being not limited to a book body, a toy, a daily article, a packing box or a device of any form, and the medium 400 can be but not limited to a card, a tag, a film, a book, a jigsaw, a building block, a magnetic tag, a paper article, a non-paper article, etc. When the interactive platform carrier is a book body, referring to FIG. 6, the interactive platform carrier comprises a front book cover, a back book cover and a plurality of book pages, and the sounding device 200 is installed and fixed in the back book cover or a book side. The sensing circuit board 300 is arranged in the front book cover, the back book cover and the book pages, the code of the chip can be confirmed and the loudspeaker 202 can be controlled to make correct sound as long as the positions of the card and the sensing circuit board 300 are aligned; certainly, as shown in FIG. 7, a card groove 500 of corresponding card can also be arranged in the front book cover, the back book cover and the book pages, and when the card is placed in the card groove 500, the code corresponding to the conductive pattern 401 of the card can be recognized and the sound of corresponding code is made. As shown in FIG. 8, a front side of the card is an apple pattern, a back side is the conductive pattern 401 corresponding to the apple pattern, and when the card is placed in the card groove 500, the sounding device 200 sounds English pronunciation of apple, which plays the role of education and interaction.

Figure 18:
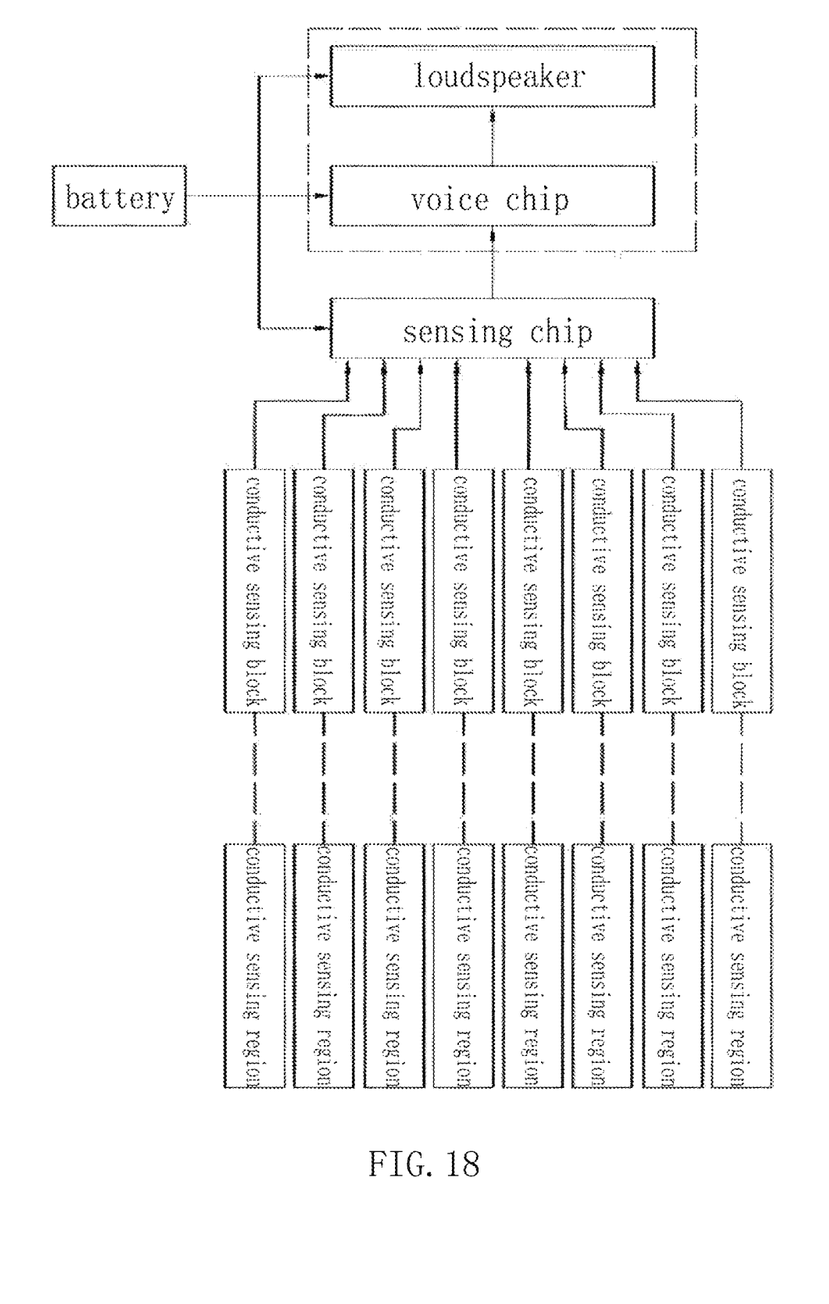
FIG. 18 is a functional block diagram of a circuit according to the disclosure.

The circuit functional diagram of the interactive platform according to the disclosure is shown in FIG. 18.

Figure 9:
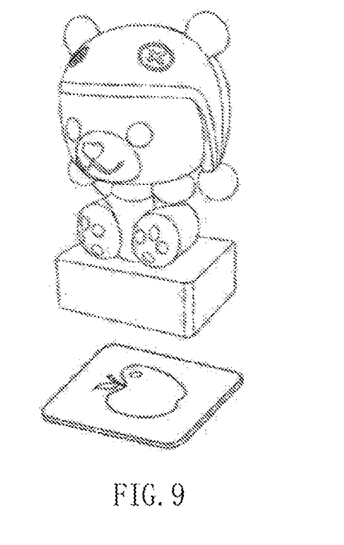
FIG. 9 is a structural diagram of the interactive platform applied to a toy according to the disclosure.
Figure 10:
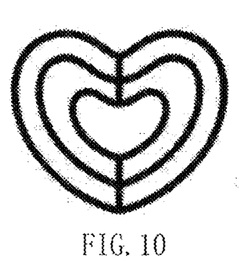
FIG. 10 to FIG. 13 are patterns of other shapes of the conductive patterns on the medium according to the disclosure.
Figure 11:
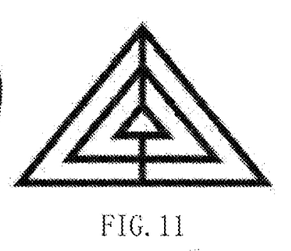
Figure 12:
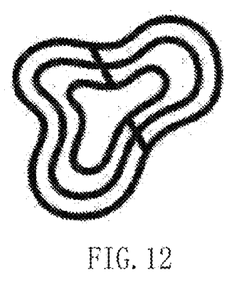
Figure 13:
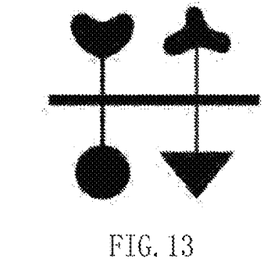

When the interactive platform carrier is a toy, the sensing circuit board 300 is fixed in the toy, the interactive platform carrier can recognize and sound as long as the positions of the toy and a functional card are aligned. The toy can have different forms, as shown in FIG. 1 and FIG. 9, the toy is a toy stamp, the sensing circuit board 300 is arranged at a bottom of the toy stamp, and the medium 400 can be but not limited to a card, a tag, a film, a book, a jigsaw, a building block, a magnetic tag, a paper article, a non-paper article, etc. When the interactive platform carrier is a card, the toy stamp is placed on the card to recognize and sound, when the interactive platform carrier is a tag, a user can paste the tag on a book, a desktop, a wall or any other positions, and the interactive platform carrier can recognize and sound as long as the toy stamp is stamped on the tag. In a similar way, the toy stamp can be contacted with the toy article or the daily article to make sound, which has the advantages of good interaction, high flexibility and good playability.

Except for the stamp, other forms of toys can also be used, and the interactive platform carrier is not limited to the book body or the toy above either.

The foregoing descriptions are merely preferred embodiments of the disclosure, and the disclosure is not limited to the foregoing embodiments. Any technical solution that achieves the object of the disclosure by the same means shall fall within the protection scope of the disclosure.

The invention claimed is:

1. A conductive pattern reading device, comprising
a sensing circuit board including one or more conductive sensing blocks and a sensing chip used for sensing and detecting a capacitance value of each conductive sensing block; and
a medium printed with conductive patterns of corresponding codes and provided with one or more conductive sensing regions,
wherein the conductive patterns are printed in the corresponding conductive sensing regions, the conductive sensing blocks correspond to the conductive sensing regions, and the sensing chip is connected to each conductive sensing block on the sensing circuit board.

2. The conductive pattern reading device according to claim 1, wherein: the sensing circuit board is provided with a common sensing block; the medium is provided with a common sensing region corresponding to the common sensing block; and the conductive patterns are continuously printed on the common sensing region and the conductive sensing region.

3. The conductive pattern reading device according to claim 2, wherein: the common sensing block and the common sensing region are rectangular, circular, annular or heart-shaped.

4. The conductive pattern reading device according to claim 1, wherein: the medium and the conductive patterns on the medium are formed by an independent part, or formed by two or more parts through jointing.

5. The conductive pattern reading device according to claim 4, wherein: partial conductive patterns on each part are corresponding to an independent code; and the conductive pattern after mutually combining the parts is corresponding to another independent code.

6. The conductive pattern reading device according to claim 1, wherein: the medium is a card, a tag, a toy or a daily article, and the conductive pattern on the medium is formed by means of conductive printing carbon paste, silver paste, hot stamping or cold-stamping.

7. The conductive pattern reading device according to claim 1, wherein: the conductive sensing region and the conductive sensing block are rectangular, circular, annular or heart-shaped.

8. A conductive pattern reading method based on the conductive pattern reading device according to claim 1, wherein: different conductive patterns on the medium are corresponding to different codes; a capacitance value of each conductive sensing block is sensed and detected by a sensing chip of the sensing circuit board; when the sensing circuit board is contacted with or close to the medium printed with the conductive pattern, the capacitance value of the conductive sensing block corresponding to the conductive sensing region printed with the conductive pattern is changed; the sensing chip converts the corresponding code of the conductive pattern through sensing the capacitance value of each conductive sensing block.

9. An interactive platform applying the conductive pattern reading device according to any one of claim 1, comprising an interactive platform carrier including a sensing chip, a sounding device and the sensing circuit board, wherein: the sounding device, the sensing chip and the sensing circuit board are connected in sequence; the sensing chip senses the corresponding conductive pattern on the medium through the sensing circuit board and converts the corresponding conductive pattern into a corresponding code; and the sounding device drives a loudspeaker to sound correspondingly according to the corresponding code.

10. The interactive platform according to claim 9, wherein: the interactive platform carrier comprising a book body, a toy, a daily article or a packing box.

* * * * *